(12) United States Patent
Brita et al.

(10) Patent No.: US 12,509,533 B2
(45) Date of Patent: Dec. 30, 2025

(54) PROCESS FOR THE PREPARATION OF A CATALYST COMPONENT AND COMPONENTS THEREFROM OBTAINED

(71) Applicant: BASELL POLIOLEFINE ITALIA S.R.L., Milan (IT)

(72) Inventors: Diego Brita, Ferrara (IT); Gianni Collina, Ferrara (IT); Daniele Evangelisti, Ferrara (IT); Benedetta Gaddi, Ferrara (IT); Piero Gessi, Ferrara (IT); Giampiero Morini, Ferrara (IT); Silvia Soffritti, Ferrara (IT); Paolo Vincenzi, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 812 days.

(21) Appl. No.: 17/777,365

(22) PCT Filed: Nov. 5, 2020

(86) PCT No.: PCT/EP2020/081034
§ 371 (c)(1),
(2) Date: May 17, 2022

(87) PCT Pub. No.: WO2021/099123
PCT Pub. Date: May 27, 2021

(65) Prior Publication Data
US 2022/0403059 A1 Dec. 22, 2022

(30) Foreign Application Priority Data

Nov. 20, 2019 (EP) .................................... 19210236

(51) Int. Cl.
*C08F 4/602* (2006.01)
(52) U.S. Cl.
CPC .......... *C08F 4/602* (2013.01); *C08F 2410/01* (2013.01)
(58) Field of Classification Search
None
See application file for complete search history.

(56) References Cited

U.S. PATENT DOCUMENTS

| | | |
|---|---|---|
| 4,149,990 A | 4/1979 | Giannini et al. |
| 4,298,718 A | 11/1981 | Mayr et al. |
| 4,350,510 A | 9/1982 | Tieszen et al. |
| 4,350,810 A | 9/1982 | Tieszen et al. |
| 4,399,054 A | 8/1983 | Ferraris et al. |
| 4,469,648 A | 9/1984 | Ferraris et al. |
| 4,521,573 A | 6/1985 | Lee et al. |
| 4,740,570 A | 4/1988 | Klabunde et al. |
| 4,829,034 A | 5/1989 | Iiskolan et al. |
| 5,100,849 A | 3/1992 | Miya et al. |
| 5,599,760 A | 2/1997 | Brun et al. |
| 5,733,987 A | 3/1998 | Covezzi et al. |
| 2016/0137759 A1 | 5/2016 | Brita et al. |

FOREIGN PATENT DOCUMENTS

| | | |
|---|---|---|
| BR | 112019011717 A2 | 10/2019 |
| CN | 102060951 A | 5/2011 |
| DE | 2735672 A1 | 2/1978 |
| EP | 0395083 A2 | 10/1990 |
| FR | 2691142 A1 | 11/1993 |
| WO | 9221706 A1 | 12/1992 |
| WO | 9303078 A1 | 2/1993 |
| WO | 9844009 A1 | 10/1998 |
| WO | 2004106388 A2 | 12/2004 |
| WO | 2014048964 A1 | 4/2014 |
| WO | 2014161905 A1 | 10/2014 |
| WO | 2015135903 A1 | 9/2015 |
| WO | 2016050662 A1 | 4/2016 |
| WO | 2017042058 A1 | 3/2017 |
| WO | 2018011086 A1 | 1/2018 |
| WO | WO-2018114453 A1 * | 6/2018 ............ C08F 110/02 |

OTHER PUBLICATIONS

International Search Report and Written Opinion Mailed Feb. 4, 2021 (Feb. 4, 2021) For Corresponding PCT/EP2020/081034.

* cited by examiner

*Primary Examiner* — Michael Forrest
*Assistant Examiner* — Nicole Lee Quist

(57) ABSTRACT

A process for preparing a catalyst component made from or containing Mg, Ti, and at least an electron donor compound (ID), including the steps of: (a) reacting a Mg based compound with a Ti compound, having at least a Ti—Cl bond, in an amount such that the Ti/Mg molar ratio is greater than 3 and at a temperature ranging from 0 to 150° C., thereby yielding an intermediate solid catalyst component containing Mg and Ti; and (b) contacting the intermediate solid catalyst component with a gaseous stream containing the electron donor compound (ID) in a gaseous dispersing medium, thereby yielding a final solid catalyst component having an ID/Ti molar ratio ranging from 0.5:1 to 20:1.

15 Claims, No Drawings

PROCESS FOR THE PREPARATION OF A CATALYST COMPONENT AND COMPONENTS THEREFROM OBTAINED

This application is the U.S. National Phase of PCT International Application PCT/EP2020/081034, filed Nov. 5, 2020, claiming benefit of priority to European Patent Application No. 19210236.6, filed Nov. 20, 2019, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a process for the preparation of a catalyst component for the polymerization of olefins $CH_2$=CHR, wherein R is hydrogen or a hydrocarbon radical having 1-12 carbon atoms.

BACKGROUND OF THE INVENTION

A type of Ziegler-Natta catalyst for the polymerization of olefins includes titanium compounds supported on magnesium halides. In some instances, the catalyst's performance is modified by including organic electron donor compounds, which are called "internal donors" (ID), in the solid catalyst.

In some instances, for preparing stereospecific catalysts and after a first contact between $MgCl_2$ or the precursor of $MgCl_2$ with the electron donor compound and a liquid titanium compound, the resulting solid is further treated with hot liquid titanium compound. In some instances, tuning the final amount of donor is difficult because the successive treatments with the hot liquid titanium compound remove part of the donor.

In some instances, certain classes of electron donors are not usable in the process because the electron donors are unstable under the hot treatments with the liquid titanium compound.

In some instances, a large excess of the electron donor compound acts as a solvent in respect of $MgCl_2$ and the liquid titanium compound and fixes the donor on the catalyst component.

In those instances, catalyst component may be separated from the solution by precipitation or crystallization. However, in some instances, certain donors are not usable because the donor's chemical structure prevents the donors from acting as solvents.

In some instances, to prepare a catalyst component with high porosity, a quantity of donor is removed from the catalyst component. Alternatively, the catalyst is deposited on a porous inert support.

In some instances, to prepare a solid catalyst component, the first step is a reaction between the $MgCl_2$ compound, or precursor of the $MgCl_2$ compound, with the Ti compound. Next and in the presence of a liquid inert compound, the electron donor compound is added to the intermediate solid obtained from the first step. For large scale production, the quantity of solvents presents storage, control, sustainability, safety, recycling, and disposal concerns.

SUMMARY OF THE INVENTION

In a general embodiment, the present disclosure provides a process for preparing a catalyst component made from or containing Mg, Ti, and at least an electron donor compound (ID), including the steps of: (a) reacting a Mg based compound with a Ti compound, having at least a Ti—Cl bond, in an amount such that the Ti/Mg molar ratio is greater than 3 and at a temperature ranging from 0 to 150° C., thereby yielding an intermediate solid catalyst component containing Mg and Ti; and (b) contacting the intermediate solid catalyst component with a gaseous stream containing the electron donor compound (ID) in a gaseous dispersing medium, thereby yielding a final solid catalyst component having an ID/Ti molar ratio ranging from 0.5:1 to 20:1.

DETAILED DESCRIPTION OF THE INVENTION

In some embodiments, the electron donor compound (ID) is a molecule containing at least one functional group selected from the group consisting of esters, ketones, amines, amides, carbamates, carbonates, aliphatic ethers, nitriles, alkoxysilanes, and glycols. In some embodiments, the ID compound is monofunctional or multifunctional. As used herein, the phrase "monofunctional or multifunctional" refers to a molecule containing one or more functional groups. In some embodiments, the multifunctional molecules have functional group belonging to the same or different class. In some embodiments, the electron donor compounds are monofunctional ID compounds. In some embodiments, the electron donor compound (ID) is a molecule containing at least one functional group selected from the group consisting of tetrahydrofuran, methylformiate, ethylacetate ethylformiate, methylacetate, propylacetate, i-propylacetate, n-butylacetate, i-butylacetate, methyltrimethoxysilane, dimethyldimethoxysilane, and trimethylmethoxysilane.

In some embodiments, the electron donor compound (ID) is used alone. In some embodiments, the electron donor compound is a mixture of two or more different IDs.

In some embodiments, the electron donor compound (ID) is selected from the group consisting of alkyl esters of $C_1$-$C_{20}$ aliphatic carboxylic acids. In some embodiments, the electron donor compound (ID) is selected from the group consisting of $C_1$-$C_8$ alkyl esters of aliphatic mono carboxylic acids. In some embodiments, the $C_1$-$C_8$ alkyl esters of aliphatic mono carboxylic acids are selected from the group consisting of ethylacetate, methyl formiate, ethylformiate, methylacetate, propylacetate, i-propylacetate, n-butylacetate, and i-butylacetate. In some embodiments, the $C_1$-$C_8$ alkyl esters of aliphatic mono carboxylic acids is ethylacetate.

In some embodiments, the electron donor compound (ID) is selected from the group consisting of alkoxysilanes of formula $R_a^5 R_b^6 Si(OR^7)_c$, where a and b are integer from 0 to 2, c is an integer from 1 to 4 and the sum (a+b+c) is 4; $R^5$, $R^6$, and $R^7$, are alkyl, cycloalkyl or aryl radicals with 1-18 carbon atoms optionally containing heteroatoms. In some embodiments, the silicon compounds have a is 0 or 1, c is 2 or 3, $R^6$ is an alkyl or cycloalkyl group, optionally containing heteroatoms, and $R^7$ is methyl. In some embodiments, the silicon compounds are selected from the group consisting of methyltrimethoxysilane, dimethyldimethoxysilane, trimethylmethoxysilane, and t-butyltrimethoxysilane.

In some embodiments, the electron donor compound (ID) is selected from the group consisting of amines of formula $NR^4_3$, wherein the $R^4$ groups, are, independently, hydrogen or a $C_1$-$C_{20}$ hydrocarbon group with the proviso that the $R^4$ groups are not contemporaneously hydrogen. In some embodiments, $R^4$ is a $C_1$-$C_{10}$ alkyl group. In some embodiments, the electron donor compound (ID) is selected from the group consisting of diethylamine, diisopropylamine, and triethylamine.

In some embodiments, the electron donor compound (ID) is selected from the group consisting of amides of formula $R^5CONR^6{}_2$, wherein $R^5$ and $R^6$ are, independently, hydrogen or a $C_1$-$C_{20}$ hydrocarbon group. In some embodiments, the electron donor compound (ID) is selected from the group consisting of formamide and acetamide.

In some embodiments, the electron donor compound (ID) is selected from the group consisting of nitriles of formula $R^3CN$, wherein $R^3$ has the same meaning given above. In some embodiments, the electron donor compound (ID) is acetonitrile.

In some embodiments, the electron donor compound (ID) is selected from the group consisting of glycols having a total number of carbon atoms lower than 50. In some embodiments, the electron donor compound (ID) is selected from the group consisting of 1,2 glycols and 1,3 glycols, having a total number of carbon atoms lower than 25. In some embodiments, the glycols are selected from the group consisting of ethylene glycol, 1,2-propylene glycol, and 1,3-propylene glycol.

In some embodiments, the electron donor compound (ID) is selected from the group consisting of $C_2$-$C_{20}$ aliphatic ethers, alternatively cyclic ethers. In some embodiments, the cyclic ethers have 3-5 carbon atoms. In some embodiments, the cyclic ethers are selected from the group consisting of tetrahydrofuran and dioxane. In some embodiments, the electron donor compound (ID) is selected from the group consisting of linear $C_2$-$C_{20}$ aliphatic ethers selected from the group consisting of dimethyl ether, diethyl ether, and iso-amyl ether.

In some embodiments, two or more IDs are fixed on the catalyst component. In some embodiments, a first ID is selected from aliphatic ethers and a second ID is selected from aliphatic acid esters. In some embodiments, a first ID is selected from $C_2$-$C_{20}$ aliphatic ethers and a second ID is selected from alkyl esters of $C_1$-$C_{20}$ aliphatic carboxylic acids. In some embodiments, the first ID is tetrahydrofuran as an aliphatic ether and the second ID is ethyl acetate as an aliphatic acid ester. In some embodiments, the molar ratio between the aliphatic acid ester and the aliphatic ether in the final solid catalyst component ranges from 0.2:1 to 16:1, alternatively from 0.5:1 to 10:1.

In some embodiments, the titanium compound of step (a) is selected from the group consisting of Ti tetrachlorides and the Ti compounds of formula $TiCl_n(OR^I)_{4-n}$, where $0 \leq n \leq 3$, and $R^I$ is $C_1$-$C_{10}$ hydrocarbon group. In some embodiments, the titanium compound is titanium tetrachloride.

In some embodiments, the Mg based compound of step (a) is $MgCl_2$ or a $MgCl_2$ precursor of formula $MgR^{II}{}_2$ where the $R^{II}$ groups is independently $C_1$-$C_{20}$ hydrocarbon groups optionally substituted, —OR groups, —OCOR groups, halogen, wherein R is a $C_1$-$C_{20}$ hydrocarbon groups optionally substituted, with the proviso that the $R^{II}$ groups are not simultaneously halogen. In some embodiments, the $MgCl_2$ precursors are Lewis adducts between Mg dihalides and Lewis bases. In some embodiments, the Lewis adducts are $MgCl_2$ $(ROH)_m$ adducts, wherein R groups are $C_1$-$C_{20}$ hydrocarbon groups, alternatively $C_1$-$C_{10}$ alkyl groups, and m is from 0.1 to 6, alternatively from 0.5 to 3, alternatively from 0.5 to 2. In some embodiments, the $MgCl_2$ $(ROH)_m$ adducts are obtained by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. In some embodiments, the procedure for the preparation of the spherical adducts are as disclosed in U.S. Pat. Nos. 4,469,648, 4,399,054, and Patent Cooperation Treaty Publication No. WO98/44009. In some embodiments, adducts contain salts or oxides of metals such as Cu, Zn and Bi as described in Patent Cooperation Treaty Publication Nos. WO2014/048964, WO2014/161905, WO2015/135903, WO2016/050662, and WO2018/011086. In some embodiments, the method for spherulization is spray cooling as described in U.S. Pat. Nos. 5,100,849 and 4,829,034.

In some embodiments, the adducts are $MgCl_2 \cdot (EtOH)_m$ adducts, wherein m is from 0.15 to 2.5, which are obtained by subjecting the adducts with a higher alcohol content to a thermal dealcoholation process carried out in nitrogen flow at temperatures between 50 and 150° C. until the alcohol content is reduced to the above value. In some embodiments, the process is as described in European Patent No. EP395083.

In some embodiments, the dealcoholated adducts are characterized by a porosity (measured by mercury method) due to pores with radius up to 1 m ranging from 0.15 to 3.0 $cm^3/g$, alternatively from 0.25 to 2.5 $cm^3/g$.

In some embodiments, step (a) is carried out by suspending the Mg based compound in $TiCl_4$. In some embodiments, the Mg based compound is a $MgCl_2 \cdot (EtOH)_m$ adduct. In some embodiments, the mixture is heated up to temperatures ranging from 80-135° C. and maintained at this temperature for 0.5-2 hours. In some embodiments, other components are used as described in Patent Cooperation Treaty Publication Nos. WO2018/011086 and WO2017/042058. In some embodiments, the other components are salts or oxides of metals such as Cu, Zn and Bi. In some embodiments, the treatment with the titanium compound is carried out one or more times. In some embodiments, the treatment is repeated twice. At the end of the process, the solid is recovered by separation of the suspension. In some embodiments, the separation method is selected from the group consisting of settling and removing of the liquid, filtration, centrifugation. In some embodiments, the solid is subject to washings with solvents. In some embodiments, the washings are carried out with inert hydrocarbon liquids. In some embodiments, the washings are carried out with more polar solvents. In some embodiments, the more polar solvents have dielectric constant higher than the inert hydrocarbon liquids. In some embodiments, the polar solvents are halogenated hydrocarbons.

In some embodiments and before step (b), the solid intermediate obtained from step (a) undergoes post-treatment to impart specific properties In some embodiments, the solid intermediate is pre-polymerized in a pre-polymerization step. In some embodiments, the pre-polymerization is carried out with olefins $CH_2=CHR'$, wherein R' is H or a $C_1$-$C_{10}$ hydrocarbon group. In some embodiments, ethylene or propylene or mixtures thereof are pre-polymerized with one or more α-olefins. In some embodiments, the mixtures contain up to 20% in moles of α-olefin and form amounts of pre-polymer from about 0.1 g up to about 1000 g per gram of solid intermediate, alternatively from about 0.5 to about 500 g per gram per gram of solid intermediate, alternatively from 0.5 to 50 grams per gram of solid intermediate. In some embodiments, the pre-polymerization step is carried out at temperatures from 0 to 80° C., alternatively from 5 to 70° C., in the liquid or gas phase. In some embodiments, the pre-polymerization of the intermediate with ethylene or propylene produces an amount of polymer ranging from 0.5 to 20 g per gram of intermediate. In some embodiments, the pre-polymerization is carried out with the use of a cocatalyst such as organoaluminum compounds. In some embodiments, the cocatalyst is used in combination with one or more external donors.

In step (b), the solid intermediate product (post-treated or not) is brought into contact with the ID compound.

In some embodiments, the amount of ID compound fixed on the catalyst component is such that ID/Ti molar ranging from 0.5:1 to 20:1, alternatively from 1.0:1 to 15:1, alternatively from 1.5:1 to 13:1.

In some embodiments, the ID compound is selected from aliphatic ethers and the ID/Ti molar ratio ranges from 3.0:1 to 15:1, alternatively from 5:1 to 13:1.

In some embodiments, the ID compound is selected from alkyl esters of $C_1$-$C_{20}$ aliphatic carboxylic acids and the ID/Ti molar ratio ranges from 1.5:1 to 7:1, alternatively from 2:1 to 6:1.

In some embodiments, the ID compound is a mixture of a first ID selected from aliphatic ethers and a second ID selected from aliphatic acid esters, and the ID (total)/Ti molar ratio ranges from 1.5:1 to 6:1, alternatively from 2:1 to 6:1.

As used herein, the term "efficiency of donor fixation" refers to the amount of donor fixed with respect the amount of donor fed in step (b). In some embodiments, the molar ratio between the ID fed in step (b) and the amount of Ti atoms in the solid intermediate is higher than that determined on the final solid catalyst component. In some embodiments, the efficiency of donor fixation is higher than 60%.

As mentioned, the contact between the solid intermediate coming from step (a) and the gaseous stream of the ID compound takes place in a gaseous medium as a dispersing medium.

In some embodiments, the gaseous stream is formed either by the pure ID (or IDs) being in gaseous form or by an inert gas stream, including the ID compound. In some embodiments, the inert gas stream carries the ID compound in gaseous or liquid form.

In some embodiments, pure ID in a gaseous form is obtained by bringing the ID compound in a gaseous form at a temperature higher than the equilibrium temperature at a given pressure.

In some embodiments, a stream of an inert gas containing the ID compound is employed.

In some embodiments, the inert gas stream made from or containing the ID compound is prepared by letting the stream of the inert gas flow on the surface of the liquid ID compound which is kept warm. In some embodiments, the liquid ID compound is not boiling. The inert gas flowing on the liquid surface, takes away the gas portion of the ID compound in equilibrium with the liquid phase and carries the ID compound in the reactor for the contact with the solid intermediate.

In some embodiments, the stream of an inert gas containing the ID compound is obtained by letting the stream of the inert gas bubble in the mass of the ID in liquid form, which is subsequently withdrawn and contains entrapped droplets of liquid ID. The gaseous stream containing the ID is fed to the reactor for the contact with the solid intermediate.

In some embodiments, the donor in liquid form is fed, through a mass-flow meter, to a pipe where a main stream of warm inert gas flows, thereby causing vaporization of the ID.

In some embodiments, an inert gas stream allows more accurate dosing of the ID in respect to the amount of catalysts and, moreover, the inert gas carrying the ID also contribute to the fluidization of the particles, thereby ensuring homogeneous distribution of the donor. In some embodiments, the inert gas streams are more versatile that the liquid-form streams, which is believed to result from the lack of intense heating of the ID for the inert gas streams.

In some embodiments, the inert gas is in the gaseous form at room temperature and not reactive towards the ingredients employed in the catalyst preparation. In some embodiments, the inert gas is nitrogen or light hydrocarbons. In some embodiments, the inert gas is propane. In some embodiments, the inert gas is nitrogen.

In some embodiments, the contact temperature in step (b) is in the range from 10 to 120° C., alternatively from 200 to 100° C., alternatively from 30 to 80° C. A temperature is not useful as a contact temperature if the temperature will cause decomposition or degradation of the reagents even if the temperature falls within the contact temperature range. In some embodiments, the time of the treatment depends on other conditions such as nature of the reagents, temperature, and concentration. In some embodiments, the contact step lasts from 10 minutes to 10 hours, alternatively from 0.5 to 5 hours. In some embodiments and to increase the final donor content, step (b) is repeated one or more times.

In some embodiments, the particles of the solid intermediate are kept in motion during contact, thereby avoiding biased zones of contact with the ID compound. In some embodiments, motion is achieved in a gas-phase reactor by generating the gas flow for suspending the particle by a compressor. In some embodiments, the compressor pumps the fluidizing gas through a grid and generates a vertical fluidizing gas flow that creates a bed of suspended particles (fluidized bed reactor). In some embodiments, the fluidizing gas is the same used for carrying the ID in the inert gas stream.

In some embodiments, the contact step (b) is carried out in a loop reactor including a densified zone wherein the particles flow in a densified form under the action of gravity and a fast fluidization zone where the particles flow under fast fluidization conditions. In some embodiments, the fast fluidization is obtained by a flow of an inert gas, such as nitrogen.

In some embodiments and at the end of this step, the solid particles are recovered by allowing the solid particles to settle after stopping the stirring or the fluidization.

In some embodiments, the ID compound that has not been fixed on the solid intermediate compound is recovered by condensing the ID compound from the inert gas stream. In some embodiments, condensation occurs by feeding the inert gas stream carrying the ID to a heat exchanger.

In some embodiments, the inert gas stream flowing out of the heat exchanger is recycled directly to the reactor where step (b) takes place.

In some embodiments, the ID compound is selected from cyclic aliphatic ethers and the solid catalyst component containing the supported ID is subjected to a thermal treatment carried out at temperatures ranging from 70 to 150° C., alternatively from 80° C. to 130° C., alternatively from 85 to 100° C. In some embodiments, such a treatment (annealing) is carried out within the same reactor, wherein the ID supportation takes place, by raising and maintaining the temperature of fluidizing inert gas for a heating time. In some embodiments, the heating time depends on conditions such as the maximum temperature reached. In some embodiments, the heating time ranges from 0.1 to 10 hours, alternatively from 0.5 to 6 hours. In some embodiments, higher temperatures allow the heating time to be shorter. In some embodiments, lower temperatures involve longer reaction times. In some embodiments, the annealing process is carried out immediately after the previous step, without isolating the solid product after donor supportation.

In some embodiments, the catalysts produce polymers with higher bulk density with respect to polymers obtained by catalyst, wherein step (b) is carried out in a liquid dispersing medium.

In some embodiments, the solid catalyst components are converted into catalysts for the polymerization of olefins by reacting the solid catalyst components with organoaluminum compounds.

In some embodiments, the present disclosure provides a catalyst for the polymerization of olefins $CH_2=CHR$, wherein R is hydrogen or a hydrocarbyl radical with 1-12 carbon atoms, made from or containing the product of the reaction between:
  (i) a solid catalyst component,
  (ii) an alkylaluminum compound and, optionally,
  (iii) an external electron donor compound (ED).

In some embodiments, the alkyl-Al compound is a trialkyl aluminum compound. In some embodiments, the trialkyl aluminum compound is selected from the group consisting of trimethylaluminum (TMA), triethylaluminum (TEAL), tri-n-butylaluminum, tri-n-hexylaluminum, and tri-n-octylaluminum. In some embodiments, the alkyl-Al compound is selected from the group consisting of alkylaluminum halides, alternatively alkylaluminum chlorides. In some embodiments, the alkylaluminum chlorides are selected from the group consisting of diethylaluminum chloride (DEAC), diisobutylalumunum chloride, Al-sesquichloride, and dimethylaluminum chloride (DMAC). In some embodiments, the alkyl-Al compound is a mixture of trialkylaluminums with alkylaluminum halides. In some embodiments, the alkyl-Al compound is selected from mixtures of TEAL/DEAC and TIBA/DEAC.

In some embodiments, the external electron donor compound ED is the same as or different from the (ID) compound used in step (b). In some embodiments, the external electron donor compound ED is selected from the group consisting of ethers, esters, amines, nitriles, silanes, and mixtures. In some embodiments, the external electron donor compound ED is selected from $C_2$-$C_{20}$ aliphatic ethers, alternatively cyclic ethers. In some embodiments, the cyclic ethers are 3-5 carbon atoms cyclic ethers. In some embodiments, the cycle ethers are selected from the group consisting of tetrahydrofuran and dioxane.

In some embodiments, the electron donor compound is selected from silicon compounds of formula $R_a^5 R_b^6 Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. In some embodiments, the electron donor compounds are silicon compounds, wherein a is 0, c is 3, $R^6$ is a branched alkyl or cycloalkyl group, optionally containing heteroatoms, and $R^7$ is methyl. In some embodiments, the silicon compounds are selected from the group consisting of cyclohexyltrimethoxysilane, t-butyltrimethoxysilane, and hexyltrimethoxysilane.

In some embodiments, components (i)-(iii) are fed separately into the reactor. In some embodiments, the components, optionally in the presence of small amounts of olefins, are pre-contacted for from 0.1 to 120 minutes, alternatively from 1 to 60 minutes. In some embodiments, the pre-contact is carried out in a liquid diluent at a temperature ranging from 0 to 90° C., alternatively from 20 to 70° C.

In some embodiments, the catalyst system is used directly in the main polymerization process. In some embodiments, the catalyst system is pre-polymerized. In some embodiments, the intermediate solid was not pre-polymerized before step (b). In some embodiments, a pre-polymerization step is when the main polymerization process is carried out in the gas phase. In some embodiments, the pre-polymerization is carried out with olefins $CH_2=CHR$, wherein R is H or a $C_1$-$C_{10}$ hydrocarbon group. In some embodiments, ethylene or propylene or mixtures thereof are pre-polymerized with one or more α-olefins. In some embodiments, the mixtures contain up to 20% in moles of α-olefin and form amounts of polymer from about 0.1 g per gram of solid component up to about 1000 g per gram of solid catalyst component. In some embodiments, the pre-polymerization step is carried out at temperatures from 0 to 80° C., alternatively from 5 to 70° C., in the liquid or gas phase. In some embodiments, the pre-polymerization step is performed in-line as a part of a continuous polymerization process or separately in a batch process. In some embodiments, the batch pre-polymerization of the catalyst with ethylene or propylene produces an amount of polymer ranging from 0.5 to 20 g per gram of catalyst component.

In some embodiments, the catalysts are used in gas-phase processes as described in Patent Cooperation Treaty Publication No. WO 92/21706, U.S. Pat. No. 5,733,987, and Patent Cooperation Treaty Publication No. WO 93/03078. In some embodiments, these processes include a pre-contact step of the catalyst components, a pre-polymerization step, and a gas phase polymerization step in one or more reactors in a series of fluidized or mechanically stirred bed.

In some embodiments, a gas-phase process for the polymerization of olefins includes the following steps in any mutual order:
  a) polymerizing ethylene, optionally together with one or more comonomers, in a gas-phase reactor in the presence of hydrogen and a catalyst system; and
  b) polymerizing ethylene optionally with one or more comonomers in another gas-phase reactor in the presence of hydrogen and the catalysts system of step (a);
    wherein, in at least one of the gas-phase reactors, the growing polymer particles flow upward through a first polymerization zone (riser) under fast fluidization or transport conditions, leave the riser and enter a second polymerization zone (downcomer) through which the growing polymer particles flow downward under the action of gravity, leave the downcomer and are reintroduced into the riser for establishing a circulation of polymer between the two polymerization zones.

In some embodiments and in the first polymerization zone (the riser), fast fluidization conditions are established by feeding a gas mixture made from or containing one or more olefins at a velocity higher than the transport velocity of the polymer particles. In some embodiments, the olefins are selected from the group of ethylene and comonomers. In some embodiments, the velocity of the gas mixture is from 0.5-15 m/s, alternatively 0.8-5 m/s. As used herein, the terms "transport velocity" and "fast fluidization conditions" are as defined in D. Geldart, Gas Fluidisation Technology, J. Wiley & Sons Ltd., (1986).

In the second polymerization zone (the downcomer), the polymer particles flow under the action of gravity in a densified form, thereby achieving the high density values (as defined by mass of polymer per volume of reactor) and approaching the bulk density of the polymer. In other words, the polymer flows vertically down through the downcomer in a plug flow (packed flow mode), thereby entraining small quantities of gas between the polymer particles.

When polymerizing ethylene, and optionally comonomers, in gas-phase, the amount of hydrogen used and the pressure ratio $H_2/C_2^-$ depend on the type of polyethylene to be produced and the molecular weight, expressed in terms Melt Flow Rate determined according to ASTM-D 1238 condition E. For relatively lower molecular weight (high values of MFR), the process uses a higher amount of hydrogen and has a higher pressure ratio $H_2/C_2^-$. In some embodiments, the pressure ratio ranges from 0.5 to 5, alternatively from 1 to 4, alternatively from 1.5 to 3.5.

In some embodiments, the catalysts are used for preparing linear low density polyethylenes (LLDPE, having a density lower than 0.940 $g/cm^3$) and very-low-density and ultra-low-density polyethylenes (VLDPE and ULDPE, having a density lower than 0.920 $g/cm^3$, to 0.880 $g/cm^3$) consisting of copolymers of ethylene with one or more alpha-olefins having from 3 to 12 carbon atoms, having a mole content of units derived from ethylene of higher than 80%. In some embodiments, the catalysts are used to prepare a broad range of polyolefin products. In some embodiments, the polyolefin products are selected from the group consisting of high density ethylene polymers (HDPE, having a density higher than 0.940 $g/cm^3$), made from or containing ethylene homopolymers and copolymers of ethylene with alpha-olefins having 3-12 carbon atoms; elastomeric copolymers of ethylene and propylene; and elastomeric terpolymers of ethylene and propylene with smaller proportions of a diene having a content by weight of units derived from ethylene of between about 30 and 70%.

The following examples are given to further describe the present disclosure.

Characterization

The properties are determined according to the following methods:

Melt Index E: ASTM-D 1238 condition E
Melt Index F: ASTM-D 1238 condition F
Melt Index P: ASTM D 1238 condition P
Bulk density: DIN-53194
Determination of Mg Ti (Tot) was Carried Out Via Inductively Coupled Plasma Emission Spectroscopy (ICP) on a "I.C.P Spectrometer ARL Accuris".

The sample was prepared by analytically weighing, in a "fluxy" platinum crucible", 0.1+03 g of catalyst and 3 gr of lithium metaborate/tetraborate 1/1 mixture. The crucible was placed on a weak Bunsen flame for the burning step and then, after addition of some drops of KI solution, inserted in a "Claisse Fluxy" apparatus for complete burning. The residue was collected with a 5% v/v $HNO_3$ solution and then analyzed via ICP at the following wavelength: Magnesium, 279.08 nm; Titanium, 368.52 nm; Aluminum, 394.40 nm.

Determination of Cl was carried out via potentiometric titration.

Determination of ED: via Gas-Chromatography analysis

Average Particle Size of the adduct and catalysts

Determined by a method based on the principle of the optical diffraction of monochromatic laser light with the "Malvern Instr. 2600" apparatus. The average size is given as P50.

Porosity and Surface Area with Mercury:

The measure was carried out using a "Porosimeter 2000 series" by Carlo Erba.

The porosity was determined by absorption of mercury under pressure. For this determination, use was made of a calibrated dilatometer (diameter 3 mm) CD3 (Carlo Erba) connected to a reservoir of mercury and to a high-vacuum pump (1·10-2 mbar). A weighed amount of sample was placed in the dilatometer. The apparatus was then placed under high vacuum (<0.1 mm Hg) and maintained in these conditions for 20 minutes. The dilatometer was then connected to the mercury reservoir. The mercury was allowed to flow slowly into the dilatometer until the mercury reached the level marked on the dilatometer at a height of 10 cm. The valve that connected the dilatometer to the vacuum pump was closed. The mercury pressure was gradually increased with nitrogen up to 140 $kg/cm^2$. Under the effect of the pressure, the mercury entered the pores. The level went down according to the porosity of the material.

The porosity ($cm^3/g$), both total and that due to pores up to 1p m, the pore distribution curve, and the average pore size were directly calculated from the integral pore distribution curve, which was function of the volume reduction of the mercury and applied pressure values (these data are provided and elaborated by the porosimeter associated computer which is equipped with a "MILESTONE 200/2.04" program by C. Erba).

Saved Solvent Amount (SSA)

SSA corresponded to the amount of solvent (liters) per Kg of catalyst supporting the electron donor on the solid intermediate catalyst (and for annealing when the annealing step was carried out).

EXAMPLES

Procedure for the Preparation of the Spherical $MgCl_2(EtOH)$ Adducts

A magnesium chloride and alcohol adduct containing 2.8 mols of alcohol was prepared following the method described in example 2 of U.S. Pat. No. 4,399,054 but working at 2000 RPM instead of 10000 RPM. The resulting adduct was dealcoholated up to an amount of alcohol of 25% wt via a thermal treatment, under nitrogen stream, over a temperature range of 50-150° C.

Example 1

Procedure for the Preparation of the Intermediate Prepolymerized Solid Catalyst Component Into a 2 L four-necked round flask, purged with nitrogen, 1 L of $TiCl_4$ was introduced at 0° C. Then, at the same temperature, 70 g of a spherical $MgCl_2$/EtOH adduct containing 25% wt of ethanol were added under stirring. The temperature was raised to 130° C. in 3 hours and maintained for 60 minutes. Then, the stirring was discontinued, the solid product was allowed to settle, and the supernatant liquid was siphoned off Fresh $TiCl_4$ was added up to 1 L total volume, and the treatment at 130° C. for 60 minutes was repeated. After settling and siphoning, the solid residue was then washed five times with hexane at 50° C. and two times with hexane at 25° C. and dried under vacuum at 30° C.

Into a 2 L four-necked glass reactor provided with stirrer, 812 cc of hexane at 10° C. and, while stirring, 50 g of the catalyst component were introduced at 10° C. Keeping constant the internal temperature, 15 g of tri-n-octylaluminum (TNOA) in hexane (about 80 g/l) and an amount of cyclohexylmethyl-dimethoxysilane (CMMS) to have molar ratio TNOA/CMMS of 6, were slowly introduced into the reactor and the temperature was maintained at 10° C. After 10 minutes stirring, a total amount of 65 g of propylene were introduced into the reactor at the same temperature in 6.5 hours at constant rate. Then, the whole content was filtered and washed three times with hexane at a temperature of 30°

C. (100 g/l). After drying, the resulting pre-polymerized catalyst (A) was analyzed. Results (Mg, Ti) are reported in Table 1.

Donor Supportation

In a 0.8 L closed circuit jacketed fluidized bed reactor having a diameter of 45 mm, 100 g of pre-polymerized catalyst were loaded under nitrogen atmosphere at room temperature.

Then, the gas circuit was closed, and the gas pump was turned on and adjusted to reach a good solid fluidization inside the reactor. The temperature was raised up to 50° C.

When the solid inside the reactor reached the desired temperature, ethylacetate (EA) and tetrahydrofuran (THF) were loaded into the liquid feeding system and added to the catalyst in about 60', using the nitrogen gas stream, to have a molar ratio EA/Mg of 0.25 and THF/Mg of 0.25. Flowing on the warm liquid surface, the inert gas took away the gas portion of the ID in equilibrium with the liquid phase and carried the ID in the reactor for contact with the solid intermediate.

After the Lewis Bases adduction, the solid remained under fluidization in the reactor for 60' at 50° C. to complete the reaction (maturation step).

Then, the temperature was decreased down to 20° C., the pump was turned off, and nitrogen was fed inside the reactor to discharge the solid.

Comparative Example 1

Donor Supportation

About 100 g of the solid prepolymerized catalyst, prepared as described in Example 1, were charged in a glass reactor purged with nitrogen and slurried with 1.0 L of heptane at 50° C.

Then, ethylacetate (EA) and tetrahydrofuran (THF) were carefully added dropwise (in 60') to have a molar ratio EA/Mg of 0.25 and THF/Mg of 0.25.

The slurry was maintained under stirring for 1.5 h with 50° C. as the internal temperature. Then, the stirring was discontinued, the solid product was allowed to settle, and the supernatant liquid was siphoned off. The solid was washed under stirring one time adding anhydrous heptane at 50° C. up to 1 L of volume, and then the stirring was discontinued. The solid product was allowed to settle, and the supernatant liquid was siphoned off. Then, the volume was restored to 1 L with anhydrous heptane, and the temperature was raised up to 85° C. and maintained under stirring for 2 hours. Then, the stirring was discontinued, the solid product was allowed to settle, and the supernatant liquid was siphoned off.

The solid was washed 3 times with anhydrous hexane (3×1000 mL) at 25° C., recovered, dried under vacuum, and analyzed. The results are reported in Table 1.

Example 2

A catalyst component containing ethyl acetate and THF was prepared as described in Example 1 and subjected to annealing.

After the donor adduction and the maturation phase, an annealing step was carried out on the pre-polymerized adduced catalyst.

The temperature was raised from 50° C. up to 85° C., and the solid was maintained under fluidization at this temperature for 60'.

Then, the temperature was decreased down to 20° C., the pump was turned off, and nitrogen was fed inside the reactor to discharge the solid.

Example 3

Preparation of the Solid Intermediate Component.

Into a 500 mL four-necked round flask, purged with nitrogen, 250 mL of TiCl$_4$ were introduced at 0° C. Then, at the same temperature, 10 grams of spherical adduct, containing 25% wt of ethanol and having particle size P50 of about 40 μm, were added under stirring. The temperature was raised to 130° C. and maintained at that temperature for 2 hours. Then, the stirring was discontinued, the solid product was allowed to settle, and the supernatant liquid was siphoned off. A new amount of fresh TiCl$_4$ was added to the flask, to reach the initial liquid volume. The temperature was maintained at 110° C. for 1 hour. Again, the solid was allowed to settle, and the liquid was siphoned off.

The solid was then washed three times with anhydrous hexane (100 mL at each washing) at 60° C. and twice at 40° C. Finally, the solid intermediate component was dried under vacuum.

Donor Supportation

In a 0.8 L DN45 closed circuit jacketed fluidized bed reactor 50 g of the solid intermediate component were loaded under nitrogen atmosphere at room temperature.

Then, the gas circuit was closed, and the gas pump was turned on and adjusted to reach a good solid fluidization inside the reactor. Then, the temperature was raised up to 50° C.

When the solid reached the desired temperature, the tetrahydrofuran (THF) was loaded in the liquid feeding system and added to the catalyst in about 60', using the nitrogen gas stream, to have a molar ratio THF/Mg of 0.87. Flowing on the liquid surface, inert gas took away the gas portion of the ID in equilibrium with the liquid phase and carried the ID in the reactor for the contact with the solid intermediate.

After the THF adduction, the temperature was raised from 50° C. up to 95° C., and the solid was maintained under fluidization at this temperature for 120'.

Then, the temperature was decreased to 20° C., the pump was turned off, and nitrogen was fed inside the reactor to discharge the solid.

Comparative Example 2

10 grams of the solid intermediate catalyst component, prepared as described in Example 3, was charged, at room temperature, with 250 mL of hexane in a 500 mL four-necked round flask equipped with a mechanical stirrer and purged with nitrogen. At the same temperature and under stirring, THF was added dropwise to charge a molar ratio THF/Mg=0.87. The temperature was raised to 50° C., and the mixture was stirred for 2 hours. Then, the stirring was discontinued, the solid product was allowed to settle, and the supernatant liquid was siphoned off.

The solid was washed twice with anhydrous hexane (2×100 mL) at 40° C., recovered, and dried under vacuum.

Annealing

Into a 500 cm$^3$ four-necked round flask, purged with nitrogen, 250 cm$^3$ of heptane and 10 g of the solid were introduced at 25° C. Under stirring, the temperature was raised to 95° C. in about 30 minutes and maintained for 2 hours. Then, the temperature was decreased to 80° C., the stirring was discontinued, the solid product was allowed to settle for 30 minutes, and the supernatant liquid was siphoned off. The characterization of the solid catalyst component is reported in Table 1.

50° C., and the mixture was stirred for 2 hours. Then, the stirring was discontinued, the solid product was allowed to settle, and the supernatant liquid was siphoned off. The solid was washed twice with anhydrous hexane (2×100 mL) at 40° C., recovered, and dried under vacuum. The characterization of the solid catalyst component is reported in Table 1.

TABLE 1

| Ex | ID | EA/Mg mr | THF/Mg mr | Mg wt. % | Ti wt. % | ID tot wt. % | ID fixed wt % | ID/Ti m.r | P50 μm | Por. cm³/g | SSA L/Kgcat | Yield Kg/g | F/E | BD g/cm³ |
|---|---|---|---|---|---|---|---|---|---|---|---|---|---|---|
| 1 | EA/THF | 0.25 | 0.25 | 8.6 | 1.5 | 12.5 | 84 | 4.8 | 75 | 0.33 | 26 | 5.0 | 30 | 0.253 |
| 2 | EA/THF | 0.25 | 0.25 | 8.5 | 1.5 | 11 | 89 | 5.0 | 76 | 0.33 | 31 | 6.7 | 29.6 | 0.264 |
| 3 | THF | — | 0.87 | 14.5 | 2.9 | 27.4 | 74 | 6.2 | — | — | 50 | 17.2 | 29.5 | 0.336 |
| 4 | EA | 0.625 | | 16 | 3.1 | 28.2 | 78 | 4.3 | 59 | 0.46 | 25 | 11.5 | 31.5 | 0.337 |
| 1C | EA/THF | 0.25 | 0.25 | 10.7 | 1.8 | 11.3 | 66 | 3.8 | 81 | 0.59 | — | 9.9 | 34.0 | 0.240 |
| 2C | THF | | 0.87 | 15.5 | 2.0 | 29.8 | 74 | 10 | — | — | — | 17.5 | 29.5 | 0.340 |
| 3C | EA | 0.625 | | 14.9 | 2.9 | 26.1 | 77.5 | 4.9 | 60 | 0.543 | — | 14.2 | 29.2 | 0.308 |

Example 4

Procedure for the Preparation of the Intermediate Solid Catalyst Component

Into a 2 L four-necked round flask, purged with nitrogen, 1 L of $TiCl_4$ was introduced at 0° C. Then, at the same temperature, 70 g of a spherical $MgCl_2$/EtOH adduct containing 25% wt of ethanol were added under stirring. The temperature was raised to 130° C. in 3 hours and maintained for 60 minutes. Then, the stirring was discontinued, the solid product was allowed to settle, and the supernatant liquid was siphoned off. Fresh $TiCl_4$ was added up to 1 L total volume, and the treatment at 130° C. for 60 minutes was repeated. After settling and siphoning, the solid residue was then washed five times with hexane at 50° C. and two times with hexane at 25° C. and dried under vacuum at 30° C.

Donor Supportation

In a 0.8 L closed circuit jacketed fluidized bed reactor having a diameter of 45 mm, 50 g of intermediate solid catalyst were loaded under nitrogen atmosphere at room temperature. The gas circuit was closed, and the gas pump was turned on and adjusted to reach fluidization inside the reactor. The temperature was raised up to 50° C.

When the solid reached temperature, the ethylacetate (EA) was loaded in the liquid feeding system and added to the catalyst in about 60', using the nitrogen gas stream, to have a molar ratio EA/Mg of 0.625. Flowing on the liquid surface, inert gas took away the gas portion of the ID in equilibrium with the liquid phase and carried the ID in the reactor for contact with the solid intermediate.

After the ethyl acetate adduction, the solid remained under fluidization in the reactor for 60' at 50° C. to complete the reaction (maturation step).

Then, the temperature was decreased to 20° C., the pump was turned off, and nitrogen was fed inside the reactor to discharge the solid.

Comparative Example 3

18.75 grams of the solid intermediate catalyst component, prepared as described in Example 4, was charged, at room temperature, with 250 mL of hexane in a 500 mL four-necked round flask equipped with a mechanical stirrer and purged with nitrogen. At the same temperature and under stirring, ethyl acetate (EA) was added dropwise, to charge a molar ratio EA/Mg=0.625. The temperature was raised to

What is claimed is:

1. A process for preparing a catalyst component comprising Mg, Ti, and at least an electron donor compound (ID) comprising the steps of:
   (a) reacting a Mg based compound with a Ti compound, having at least a Ti—Cl bond, in an amount such that the Ti/Mg molar ratio is greater than 3 and at a temperature ranging from 0 to 150° C., thereby yielding an intermediate solid catalyst component containing Mg and Ti; and
   (b) contacting the intermediate solid catalyst component with a gaseous stream containing the electron donor compound (ID) in a gaseous dispersing medium, thereby yielding a final solid catalyst component having an ID/Ti molar ratio ranging from 0.5:1 to 20:1.

2. The process according to claim 1, wherein the electron donor compound (ID) is a molecule containing at least one functional group selected from the group consisting of esters, ketones, amines, amides, carbamates, carbonates, aliphatic ethers, nitriles, alkoxysilanes, and glycols.

3. The process according to claim 2, wherein the ID compound is selected from the group consisting of $C_2$-$C_{20}$ aliphatic ethers and alkyl esters of $C_1$-$C_{20}$ aliphatic carboxylic acids.

4. The process according to claim 2, wherein the ID compound is monofunctional.

5. The process according to claim 2, wherein the electron donor compound (ID) is a molecule containing at least one functional group selected from the group consisting of tetrahydrofuran, methylformiate, ethylacetate ethylformiate, methylacetate, propylacetate, i-propylacetate, n-butylacetate, i-butylacetate, methyltrimethoxysilane, dimethyldimethoxysilane, and trimethylmethoxysilane.

6. The process according to claim 2, wherein two or more IDs are used.

7. The process according to claim 6, wherein a first ID is selected from aliphatic ethers and a second ID is selected from aliphatic acid esters.

8. The process according to claim 1, wherein the Mg compound is a Lewis adduct of formula $MgCl_2(ROH)_m$ adducts, wherein R groups are $C_1$-$C_{20}$ hydrocarbon groups and m is from 0.1 to 6.

9. The process according to claim 1, wherein the intermediate solid catalyst component is pre-polymerized before being subjected to step (b).

10. The process according to claim 1, wherein, in step (b), the amount of ID compound fixed on the catalyst component is such that ID/Ti molar ranges from 1.0:1 to 15:1.

11. The process according to claim 1, wherein the gaseous stream comprises an inert gas carrying the ID compound in gaseous or liquid form.

12. The process according to claim 11, wherein the ID compound is in gaseous form.

13. The process according to claim 11, wherein the inert gas is nitrogen.

14. The process according to claim 11, wherein step (b) is carried out in a gas-phase reactor, wherein the gaseous stream comprises a fluidizing gas and wherein the fluidizing gas is an inert gas.

15. The process according to claim 1, wherein the contact temperature in step (b) is in the range from 10 to 120° C.

\* \* \* \* \*